(12) United States Patent
Hunter

(10) Patent No.: US 8,640,858 B2
(45) Date of Patent: Feb. 4, 2014

(54) METHOD AND APPARATUS FOR CONVEYING SAND MOLDS

(75) Inventor: William Gary Hunter, Barrington, IL (US)

(73) Assignee: Hunter Foundry Machinery Corporation, Schaumburg, IL (US)

( * ) Notice: Subject to any disclaimer, the term of this patent is extended or adjusted under 35 U.S.C. 154(b) by 22 days.

(21) Appl. No.: 13/324,811

(22) Filed: Dec. 13, 2011

(65) Prior Publication Data

US 2013/0146422 A1    Jun. 13, 2013

(51) Int. Cl.
*B65G 25/00* (2006.01)
*B22D 33/00* (2006.01)

(52) U.S. Cl.
USPC .......................................... 198/775; 164/324

(58) Field of Classification Search
USPC ................... 198/774.1, 775, 776, 774.3, 777; 164/130, 324, 323
See application file for complete search history.

(56) References Cited

U.S. PATENT DOCUMENTS

| | | |
|---|---|---|
| 3,682,236 A | 8/1972 | Becke |
| 4,299,269 A | 11/1981 | Friesen et al. |
| 4,589,467 A | 5/1986 | Hunter |
| 4,590,982 A | 5/1986 | Hunter |
| 4,657,064 A | 4/1987 | Hunter |
| 4,671,339 A | 6/1987 | Hunter |
| 4,699,199 A | 10/1987 | Hunter |
| 4,711,342 A * | 12/1987 | Abraham ................... 198/463.3 |
| 4,738,299 A | 4/1988 | Hunter |
| 4,840,218 A | 6/1989 | Hunter |
| 4,848,440 A | 7/1989 | Hunter |
| 4,890,664 A | 1/1990 | Hunter |
| 4,890,725 A * | 1/1990 | Fierkens et al. ........... 198/774.1 |
| 5,022,512 A | 6/1991 | Hunter |
| 5,062,465 A | 11/1991 | Mortensen |
| 5,069,268 A | 12/1991 | Hunter |
| 5,101,881 A | 4/1992 | Hunter |
| 5,170,836 A | 12/1992 | Hunter |
| 5,301,795 A * | 4/1994 | Persson ......................... 198/773 |
| 5,343,928 A | 9/1994 | Hunter |
| 5,402,938 A | 4/1995 | Sweeney |
| 5,853,042 A | 12/1998 | Hunter |
| 5,901,774 A | 5/1999 | Hunter et al. |
| 5,927,374 A | 7/1999 | Hunter et al. |
| 5,971,059 A | 10/1999 | Hunter et al. |
| 6,015,007 A | 1/2000 | Hunter et al. |
| 6,145,577 A | 11/2000 | Hunter et al. |
| 6,263,952 B1 | 7/2001 | Hunter |
| 6,533,022 B2 | 3/2003 | Hunter |
| 6,571,860 B2 | 6/2003 | Hunter et al. |
| 6,622,772 B1 | 9/2003 | Hunter |
| 6,779,586 B2 | 8/2004 | Hunter et al. |
| 6,817,403 B2 | 11/2004 | Hunter |
| 7,150,310 B2 | 12/2006 | Hunter et al. |
| 7,637,303 B2 | 12/2009 | Hunter |
| 2005/0109478 A1 | 5/2005 | Hunter et al. |

* cited by examiner

*Primary Examiner* — James R Bidwell
(74) *Attorney, Agent, or Firm* — Pauley Petersen Erickson

(57) ABSTRACT

Method and apparatus for feeding sand molds from multiple sand mold forming stations to a common metal pouring station. The method and apparatus of this invention utilize walking-beam-type conveyors having spaced apart fixed outboard rails and a central reciprocating rail. Transfer devices are provided for moving the sand molds onto and off of the conveyors.

20 Claims, 7 Drawing Sheets

METHOD AND APPARATUS FOR CONVEYING SAND MOLDS

BACKGROUND OF THE INVENTION

1. Field of the Invention

This invention is directed to conveyors for feeding sand molds for metal casting from a forming machine to a metal pouring station. The method provides a method and apparatus for automatically and continually feeding prepared sand molds from multiple forming machines to a common pouring station using walking beam-type mold conveyors.

2. Discussion of Related Art

Molded metal castings are commonly manufactured at foundries through a matchplate molding technique which employs green sand molds comprised of prepared sand and additives which are compressed around cope and drag patterns mounted on opposite sides of a matchplate. The sand mold is thus formed in upper and lower matching portions, an upper cope mold, and a lower drag mold. The cope mold is formed in a separate cope flask which is filled with prepared sand and compacted onto the matchplate. The matchplate is then removed leaving an indentation in the cope mold of the desired shape for the upper portion of the casting. Simultaneously, the drag mold is formed in a separate drag flask. Usually the matchplate is in the form of a planar member with the pattern for the cope mold on one side and the pattern for the drag mold on the other. After the cope and drag molds have been formed, they are placed together to form a unitary mold having an interior cavity of the desired shape. The cavity can then be filled with molten metal through an inlet or "sprue" provided in the cope mold to create the desired casting. Such a system is disclosed in U.S. Pat. No. 5,022,212, issued to Hunter, herein incorporated by reference.

As with many volume sensitive production operations, manufacturers are required to automate the manufacturing process in order to remain competitive. Foundries engaging in the casting of metal objects through the use of green sand molds are not immune to this reality. It is common in today's marketplace, for the machine which produces the sand molds to be connected to a machine which fills the sand mold with molten metal, which in turn is connected to a machine for cooling the molten metal into a solid casting, which in turn is connected to a machine for removing the sand mold and revealing the casting for harvest. Such a system is disclosed in U.S. Pat. No. 4,589,467, issued to Hunter, herein incorporated by reference.

U.S. Pat. No. 7,637,303, issued to Hunter, herein incorporated by reference, discloses a walking-beam conveyor for transporting molds from multiple forming stations to a common pouring and/or cooling station. The walking-beam conveyor provides advantages, but may not always be able to be retrofitted into existing machinery, particularly from different manufacturers.

There is a continuing need for an improved conveyor system for transporting sand molds from the machine that produces the sand mold to, for example, the carousel conveyor.

SUMMARY OF THE INVENTION

A general object of the invention is to provide a mold conveyor that feeds molds from more than one origin, e.g., a mold forming device, to a common destination, e.g., a metal pouring station and/or cooling station.

The general object of the invention can be attained, at least in part, through a method for conveying a sand mold. The method includes: transferring the sand mold from a sand mold forming and/metal pouring station to an accumulating conveyor including a transfer rail movable with respect to at least one fixed rail; lifting the sand mold off the at least one fixed rail with the transfer rail; moving the transfer rail and the lifted sand mold in a downstream direction; lowering the lifted sand mold onto the at least one fixed rail; moving the sand mold along the first transfer conveyor in a first direction; and transferring the sand mold from the accumulating conveyor.

In some embodiments of this invention, the method can further include pulling the sand mold onto the accumulating conveyor, such as by a pulling device fixed to the accumulating conveyor. The method can also include vertically moving the sand mold at a position between the sand mold forming station and the accumulating conveyor, such as by an elevator changer fixed to the accumulating conveyor.

The method can also include continually sensing the position of the transfer rail as it moves between a first position along at least one of the first and second transfer conveyors, such as by a linear displacement sensor attached to the fixed rail.

The method can further include biasing the sand mold in a direction upward or away from the transfer conveyor to assist in lifting the sand mold, which can be especially heavy after metal pouring, with the transfer rail. A biasing member, such as at least one spring can be disposed between the transfer rail and the carrier plate on which the sand mold sits.

In one embodiment of this invention, the method for conveying sand molds begins by depositing a first sand mold on a first transfer conveyor, such as from a sand mold forming device in combination with the first transfer conveyor. The first transfer conveyor includes two outboard rails and a central transfer rail movable between the two outboard rails. The first sand mold moves along the first transfer conveyor in a first direction and is placed on a first junction resting station. The first junction resting section is at a downstream end of the first transfer conveyor, and an upstream end of a second transfer conveyor, which similarly includes two outboard rails and a central transfer rail movable between the two outboard rails.

The central transfer rail of the second transfer conveyor moves under and lifts the sand mold off the first junction resting station and moves the first sand mold along the second transfer conveyor in a second direction that is different than, and desirably perpendicular to, the first direction. The central transfer rail of the second transfer conveyor places the first sand mold on a second junction resting station that is at a downstream end of the second transfer conveyor.

Desirably operating simultaneously, a second forming machine deposits a second sand mold on a third transfer conveyor. The third transfer conveyor also includes a central transfer rail movable between two fixed outboard rails. The central transfer rail moves the second sand mold along the third transfer conveyor in a third direction that is also different than, e.g., perpendicular to, the second direction. The central transfer rail places the second sand mold on the second junction resting station, which is also at a downstream end of the third transfer conveyor. Only one of the first and second sand molds is placed on the second junction resting station at a time. A pusher mechanism is used to transfer the sand mold from the second junction resting station to a metal pouring station.

The invention further provides an apparatus for conveying sand molds. The apparatus includes a first transfer conveyor oriented in a first direction and including at least one transfer rail movable with respect to at least one fixed rail, and a second transfer conveyor in conveying combination with the first transfer conveyor. The second transfer conveyor is oriented in a second direction that is different than the first direction, and the second transfer conveyor includes at least one transfer rail movable with respect to at least one fixed rail. The apparatus further includes a transfer device attached in combination with the first transfer conveyor, wherein the transfer device transfers a sand mold from a sand mold forming station to the first transfer conveyor.

BRIEF DESCRIPTION OF THE DRAWINGS

These and other objects and features of this invention will be better understood from the following detailed description taken in conjunction with the drawings.

DEFINITIONS

Within the context of this specification, each term or phrase below will include the following meaning or meanings.

References herein to "conveying combination" are to be understood to refer to a combination of two elements, such as two conveyors, whereby an item conveyed by one element is transferable to the other element for continued conveyance to the intended destination.

References herein to "upstream" and "downstream" are to be understood with reference to directions of travel of molds on a conveyor. "Upstream" refers to a direction toward a place of origin, such as a mold forming device, and "downstream" refers to a direction toward a place of destination.

DESCRIPTION OF PREFERRED
EMBODIMENTS

Figure 1:
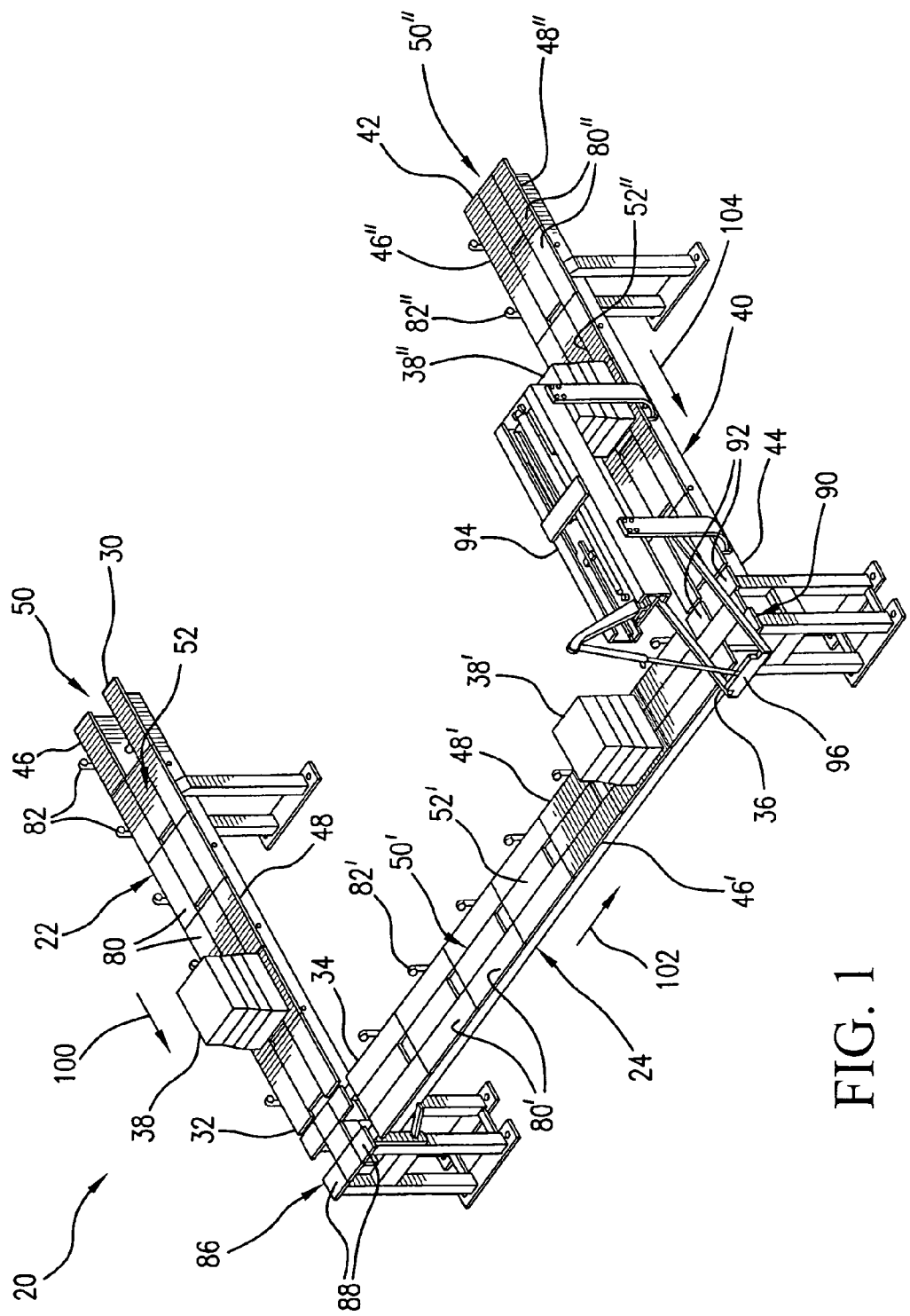
FIG. 1 is a perspective view of an accumulating mold conveyor according to one embodiment of this invention.

Referring to FIG. 1, this invention provides a conveyor assembly, shown as accumulating mold conveyor 20, for transporting sand molds from more than one sand mold forming station to a metal pouring station, such as are described in, for example, U.S. Pat. No. 6,145,577, issued to Hunter, and herein incorporated by reference.

Accumulating mold conveyor 20 includes first transport conveyor 22 oriented in a first direction, and second transfer conveyor 24 oriented in a second direction. In the embodiment of FIG. 1, first and second transfer conveyors 22 and 24 are disposed perpendicular to each other; however, the conveyors of this invention can be disposed at other angles, depending on need. First transfer conveyor 22 has an upstream end 30 that is to be disposed toward a sand mold forming station (not shown in FIG. 1), and a downstream end 32 opposite the upstream end 30. Similarly, second transfer conveyor 24 has an upstream end 34 and an opposing downstream end 36. Sand molds 38 travel along the conveyors of this invention from an upstream end to a downstream end. Downstream end 32 of first transfer conveyor 22 is in conveying communication with upstream end 34 of second transfer conveyor 24, such that a sand mold is transferred during operation from downstream end 32 of first transfer conveyor 22 to upstream end 34 of second transfer conveyor 24.

Accumulating mold conveyor 20 also includes third transfer conveyor 40 oriented in a third direction that is the same as the first direction, and also perpendicular to the second direction. Third transfer conveyor 40 has an upstream end 42 that is to be disposed toward a second sand mold forming station (not shown in FIG. 1), and a downstream end 44 opposite upstream end 42.

First transfer conveyor 22 includes first outboard rail 46 spaced apart from second outboard rail 48. Outboard rails 46 and 48 can each be formed as a single rail member or from a plurality of smaller individual rail members. A central rail channel 50 is formed between first outboard rail 46 and second outboard rail 48. Central transfer rail 52 is disposed within central rail channel 50, and is movable therein and between the two fixed outboard rails 46 and 48. Second and third transfer conveyors 24 and 40 include components identical or at least similar to first transfer conveyor 22. These components are described with reference to first transfer conveyor 22, and identified by element reference numbers associated with a prime "'" or double prime "''", respectively.

The accumulating mold conveyor of this invention is not limited to the configuration and number of fixed and moveable rails shown in FIG. 1. For example, the center rail(s) can be fixed in place and not moveable, with two or more outboard rails moveable with respect to the fixed center rail(s). Also, in one embodiment of the invention, two moveable transfer rails are disposed on either side of a fixed center rail, and each of the moveable transfer rails is between the center rail and a further fixed outboard rail (e.g., five total rails).

Figure 2:
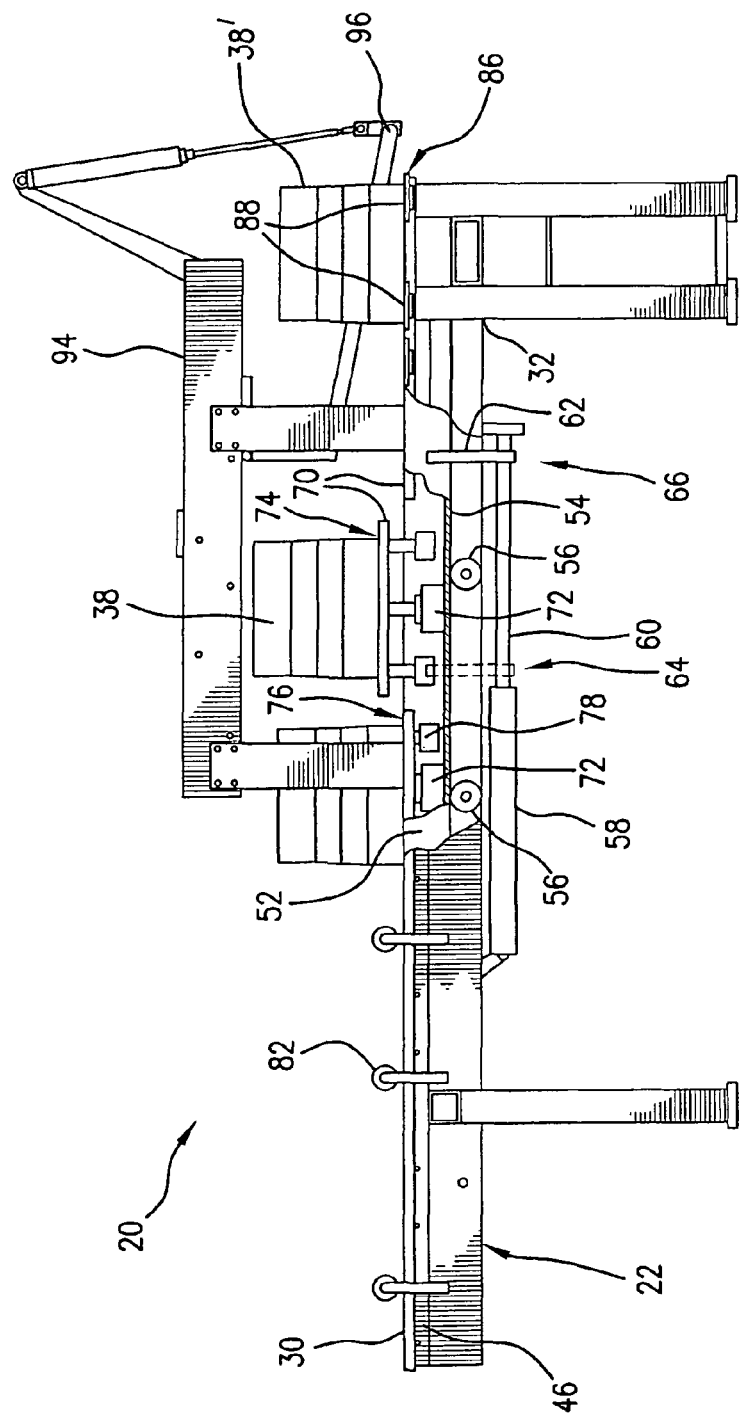
FIG. 2 is a partial sectional side view of the accumulating mold conveyor of FIG. 1.

FIG. 2 is a side view of accumulating mold conveyor 20 showing a partial sectional view of first transfer conveyor 22. Central transfer rail 52 is a reciprocating rail that includes a U-shaped frame 54 disposed upon a plurality of rollers 56. First transfer conveyor 22 includes at least one pressurized fluid piston 58, e.g., a hydraulic piston, having a moveable piston arm 60 connected to frame 54 by connector 62. Piston arm 60, and thus frame 54 and central transfer rail 52, is movable between upstream first position 64 (shown in phantom) to downstream second position 66.

A plurality of sand mold carrier plates 70 is disposed along the frame 54. Each of carrier plates 70 is attached to the frame 54 by one of a plurality of pressurized fluid lift mechanisms 72, e.g., a pneumatically actuated piston. Each of pressurized fluid lift mechanisms 72 is adapted to lift a corresponding one of carrier plates 70, and a sand mold thereon, to lifted position 74, and then to lower the corresponding one of carrier plates 70 to lowered position 76. In lowered position 76, sand molds 38 are disposed on outboard rails 46 and 48. In lifted position 74, sand molds 38 are moved to, and then lowered onto, a downstream position on outboard rails 46 and 48. Each of carrier plates 70 is supported by optional support elements 78 attached to frame 54.

The lifting distance of the sand molds 38 can vary depending on need. In one embodiment of this invention, the sand molds 38 are lifted less than an inch above the outboard rails 46 and 48, and more desirably about $1/16^{th}$ of an inch. In another embodiment, the sand molds are not actually lifted off the outboard rails, but the carrier plates place upward pressure on the sand molds to reduce friction and allow the sand molds to more easily slide along the outboard rails, similar to that disclosed in U.S. Pat. No. 4,890,664.

In the embodiment shown in FIGS. 1 and 2, outboard rails 46 and 48 are periodically laterally grooved to indicate a plurality of sand mold resting positions 80 along first transfer conveyor 22. Each of resting positions 80 are approximately correspondingly sized to the length of each of carrier plates 70. Thus, sand molds 38 are moved along first transfer conveyor 22 by lifting a sand mold 38 off outboard rails 46 and 48 at a first of resting positions 80 with a corresponding one of carrier plates 70, moving the sand mold in a downstream direction with central transfer rail 52 to dispose sand mold 38 over a second of resting positions 80, and lowering sand mold 38 onto outboard rails 46 and 48 at the second of resting positions 80. Central transfer rail 52 then moves back to the first position, and the process repeats to incrementally move, or "walk," sand mold 38 in a downstream direction on first transfer conveyor 22.

A plurality of optional sensor mechanisms 82 is disposed along first transfer conveyor 22. Each of the plurality of sensor mechanisms 82 is desirably disposed in sensing combination with one of resting positions 80. Sensor mechanisms 82 detect the presence of sand molds 38 along first transfer conveyor 22, and can be used to actuate lifting of a corresponding carrier plate 70 when a sand mold 38 is disposed above the corresponding carrier plate 70. Thus, in one embodiment of this invention, a carrier plate 70 is not lifted unless a sand mold 38 is present above. Various and alternative sensor mechanisms are available for the use in the accumulating mold conveyor 20 of this invention, such as, without limitation, motion sensors using visible or infrared light, weight sensors disposed beneath outboard rails 46 and 48, or a linear displacement sensor discussed further below.

Accumulating mold conveyor 20 includes first junction resting station 86 disposed between downstream end 32 of first transfer conveyor 22 and upstream end 34 of second transfer conveyor 24. Junction resting station 86 includes four resting pads 88 adapted to hold a sand mold thereon. Each of resting pads 88 is spaced apart from another of the resting pads, and disposed at one of the corners of junction resting station 86. The spacing between each of resting pads 88 is such that central transfer rail 52 is movable between the spaced apart resting pads 88, as shown in FIG. 1, and able to lower sand mold 38 onto resting pads 88. When the central transfer rail 52 of first transfer conveyor 22 is moved out from first junction resting station 86, central transfer rail 52' of second transfer conveyor 24 is moved between the spaced apart resting pads 88. When positioned within first junction resting station 86, central transfer rail 52' of second transfer conveyor is able to lift sand mold 38 off resting pads 88, thereby perpendicularly transferring sand mold 38 to second transfer conveyor 24.

As will be appreciated by those skilled in the art following the teachings herein provided, the number and configuration, e.g., placement, of the resting pads of the junction resting stations will depend on the configuration of the transfer conveyors, e.g., the number of rails and which rail(s) is/are moveable, as discussed above. Also, the invention is not limited to the particular accumulating mold conveyors shown in FIG. 1. Additional types of accumulating mold conveyors, such as are known in the art, can be used with the junction resting stations according to this invention to impart directional change, such as, for example, the conveyors of U.S. Pat. No. 4,890,664, issued to Hunter, and herein incorporated by reference.

Accumulating mold conveyor 20 includes second junction resting station 90 disposed between downstream end 36 of second transfer conveyor 24 and downstream end 44 of third transfer conveyor. Second junction resting station 90 is similar in configuration and function to first junction resting station 86. Second junction resting station 90 includes four spaced apart resting pads 92 for holding sand molds 38, and central transfer rails 52' and 52" of each of the second and third transfer conveyors 24 and 40, respectively, are alternatively movable between spaced apart resting pads 92 of second junction resting station 90.

Sand molds 38 placed upon second junction resting station 90 are moved from accumulating mold conveyor 20 to an associated metal pouring station, such as including a rotary mold handling table (not shown in FIG. 1). Pusher mechanism 94 is attached to third transfer conveyor 40. Pusher mechanism 94 includes a hydraulically activated pusher arm 96 adapted to push sand molds 38 off second junction resting station 90 and onto a platform of the associated pouring station.

This invention further includes a method for conveying a sand mold. The method of this invention uses an accumulating conveyor, such as described above, including a first transfer conveyor in conveying combination with a second transfer conveyor, each of the first and second transfer conveyors comprising two outboard rails and a central transfer rail movable between the two outboard rails.

In one embodiment of this invention, referring to FIG. 1, a first sand mold forming machine deposits first sand mold 38 on first transfer conveyor 22. In one embodiment of this invention, sand mold 38 is placed directly onto first transfer conveyor 22, without an optional bottom board, such as are known to those skilled in the art. Sand mold 38 moves along first transfer conveyor 22 in a first downstream direction indicated by arrow 100. First transfer conveyor 22 moves sand mold 38 by lifting the sand mold off outboard rails 46 and 48 with central transfer rail 52, moving central transfer rail 52 and the lifted sand mold 38 in the first downstream direction, and lowering the lifted sand mold 38 onto outboard rails 46 and 48. The steps for moving first sand mold 38 are repeated until first sand mold 38 is placed by central transfer rail 52 onto first junction resting station 86. Upon placing first sand mold 38 onto first junction resting station 86, central transfer rail 52 moves back upstream and out from under sand mold 38.

Central transfer rail 52' of second transfer conveyor 24 then moves under first sand mold 38 to transfer first sand mold 38 to second transfer conveyor 24. Central transfer rail 52' lifts first sand mold 38 off first junction resting station 86 and moves first sand mold 38 along second transfer conveyor 24 in the manner discussed above for first transfer conveyor 22, but in a second downstream direction, indicated by arrow 102, that is perpendicular to the downstream direction of first transfer conveyor 22. The steps for moving first sand mold 38 along second transfer conveyor 24 are incrementally repeated until first sand mold 38 is placed by central transfer rail 52 onto second junction resting station 90. Upon placing first sand mold 38 onto second junction resting station 90, central transfer rail 52 moves back upstream and out from under first sand mold 38.

The apparatus and method of this invention beneficially allow for sand molds produced by more than one sand mold forming machine to be directed into a single pouring station. A second sand mold forming machine deposits a second sand mold, represented in FIG. 1 by sand mold 38", onto third transfer conveyor 40. Central transfer rail 52" moves second sand mold 38" along third transfer conveyor 40 in the manner discussed above for first transfer conveyor 22, and in a downstream direction indicated by arrow 104 that is parallel to the downstream direction of first transfer conveyor 22. The steps for moving second sand mold 38" along third transfer conveyor 40 are repeated until second sand mold 38" is placed by central transfer rail 52" onto second junction resting station 90. Upon placing second sand mold 38" onto second junction resting station 90, central transfer rail 52" moves back upstream and out from under second sand mold 38".

Only one of the first and second sand molds 38 and 38" is placed on second junction resting station 90 at a given time. Pusher mechanism 94 pushes the sand mold placed upon second junction resting station 90 off to make room for the next sand mold. Various and alternative movement schemes are available for moving sand molds from more than one sand mold forming machine according to the invention. For example, sand molds can be continually and alternatively moved onto second junction resting station 90, e.g., first one from second transfer conveyor 24, then one from third transfer conveyor 40, then one again from second transfer conveyor 24, etc. Alternatively, multiple sand molds from the first sand mold forming machine can be moved to the pouring station, while the second forming machine is not needed or activated, and vice versa, depending on need. This embodiment can be particularly beneficial to allow one sand mold forming machine to continue while the other sand mold forming machine is being reconditioned or retooled. In one method of this invention, the presence or position of sand molds on the accumulating old conveyor 20 are sensed, such as by sensors 82, as they incrementally move along the multiple transfer conveyors.

Figure 3:
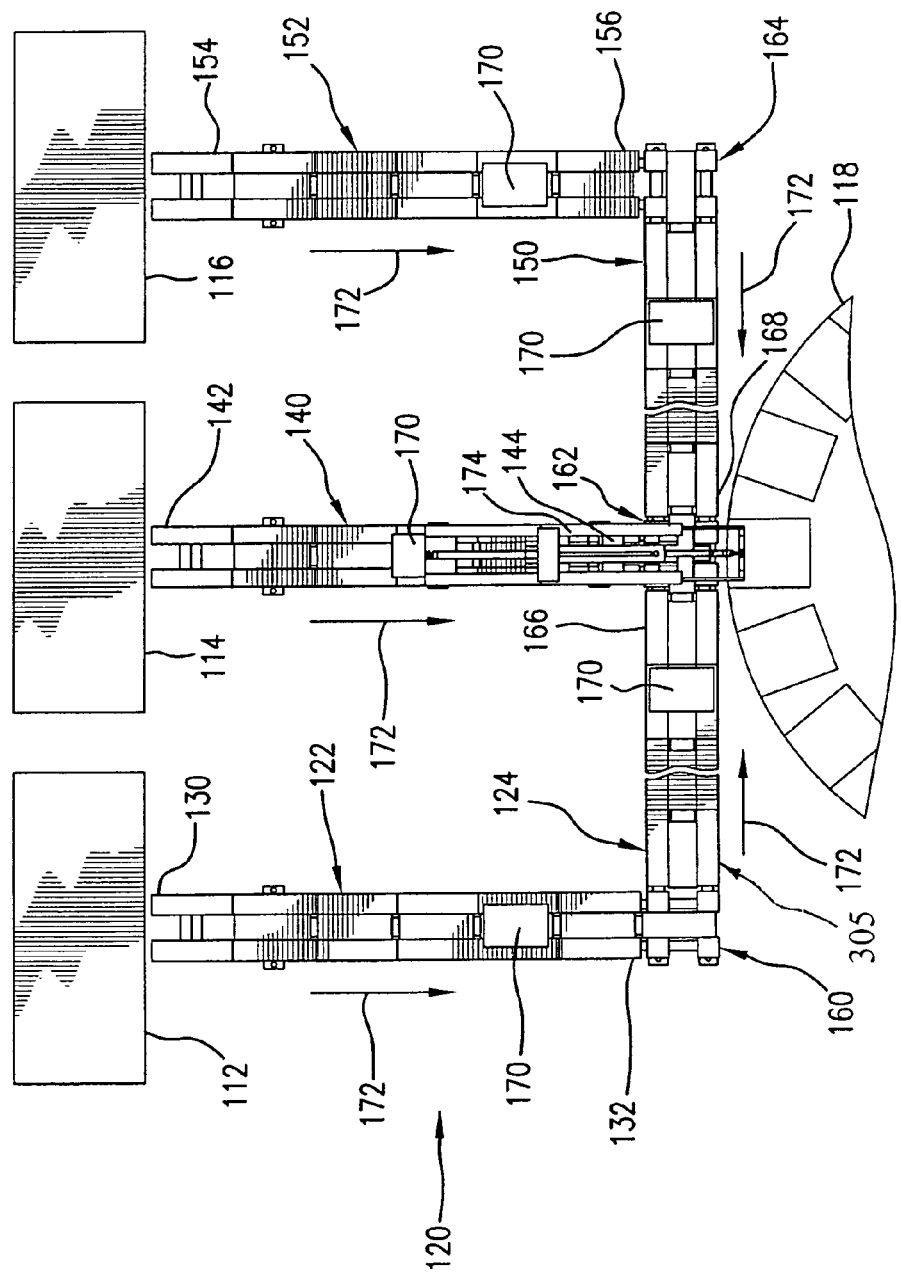
FIG. 3 is a top view of an accumulating mold conveyor according to another embodiment of this invention.

FIG. 3 illustrates an accumulating mold conveyor 120 according to another embodiment of this invention, for transporting sand molds from three sand mold forming stations 112, 114, and 116, respectively, to rotary mold handling table 118 of a metal pouring station.

Accumulating mold conveyor 120 includes first transfer conveyor 122 oriented in a first direction, and second transfer conveyor 124 oriented in a perpendicular second direction. First transfer conveyor 122 has an upstream end 130 that is disposed toward first sand mold forming station 112, and a downstream end 132 opposite the upstream end 130. Accumulating mold conveyor 120 includes third transfer conveyor 140 oriented in a third direction that is the same as the first direction and also perpendicular to the second direction. Third transfer conveyor 140 has upstream end 142 that is disposed toward second sand mold forming station 114 and downstream end 144 opposite upstream end 142. Accumulating mold conveyor 120 also includes fourth transfer conveyor 150 and fifth transfer conveyor 152. Fourth transfer conveyor 150 is parallel to and aligned with second transfer conveyor 124. Fifth transfer conveyor 152 is parallel to first and third transfer conveyor 122 and 140, and has upstream end 154 that is disposed toward third sand mold forming station 116, and downstream end 156 opposite upstream end 154. Each of the first through fifth transfer conveyors 122, 124, 140, 150, and 152, include a central transfer rail movable between two fixed outboard rails, and function as described above with reference to FIGS. 1 and 2. For sake of brevity, details about these components are incorporated from above, and not repeated here.

First transfer conveyor 122 is connected in conveying combination with second transfer conveyor 124 at first junction resting station 160. Fifth transfer conveyor 152 is connected in conveying combination with fourth transfer conveyor 150 at third junction resting station 164. Second junction resting station 162 is disposed at and between second transfer conveyor downstream end 166, third conveyor downstream end 144, and fourth conveyor downstream end 168. Sand molds 170 travel (in the manner described above) along the respective transfer conveyors of accumulating mold conveyor 120 from the sand mold forming machines 112, 114, or 116 to second junction resting station 162 in the directions indicated by arrows 172. Once reaching second junction resting station 162, sand molds 170 are pushed off second junction resting station 162 onto rotary mold handling table 118 by pusher mechanism 174.

As will be appreciated by those skilled in the art following the teachings herein provided, various and alternative configurations are available for the mold accumulating conveyor, transfer conveyors, and junction resting stations of this invention. In addition, the accumulating conveyor can be adapted for use with existing sand mold forming stations, metal pouring stations, and/or rotary tables. In one embodiment of this invention, the accumulating conveyor includes optional features to allow for use of the accumulating conveyor with sand mold forming stations and/or rotary tables that were not manufactured to be combined with the accumulating conveyor, such as for retrofitting older machinery or for use with machinery from different manufacturers.

Figure 4:
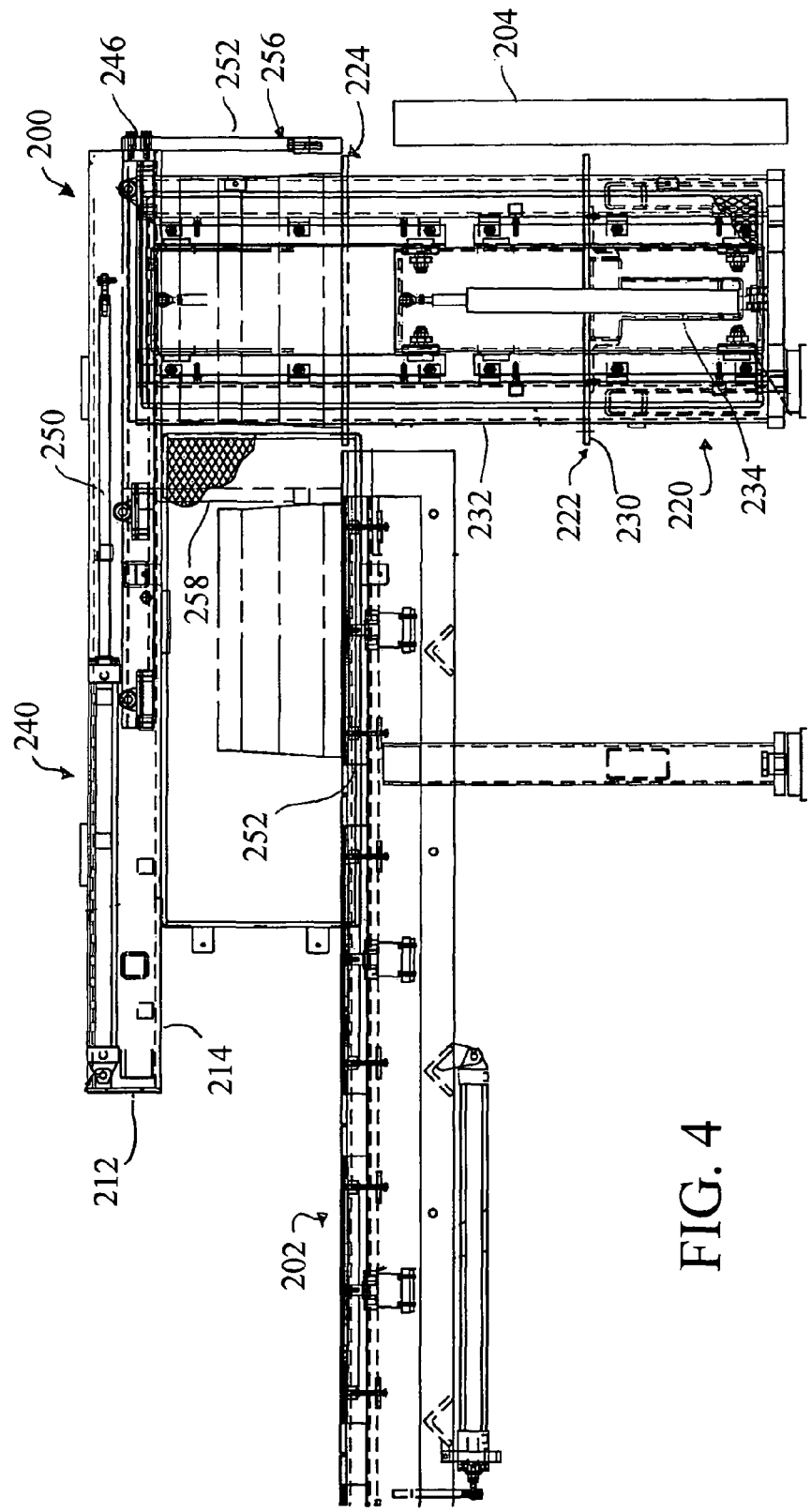
FIG. 4 is side view of an accumulating mold conveyor transfer device according to one embodiment of this invention.
Figure 5:
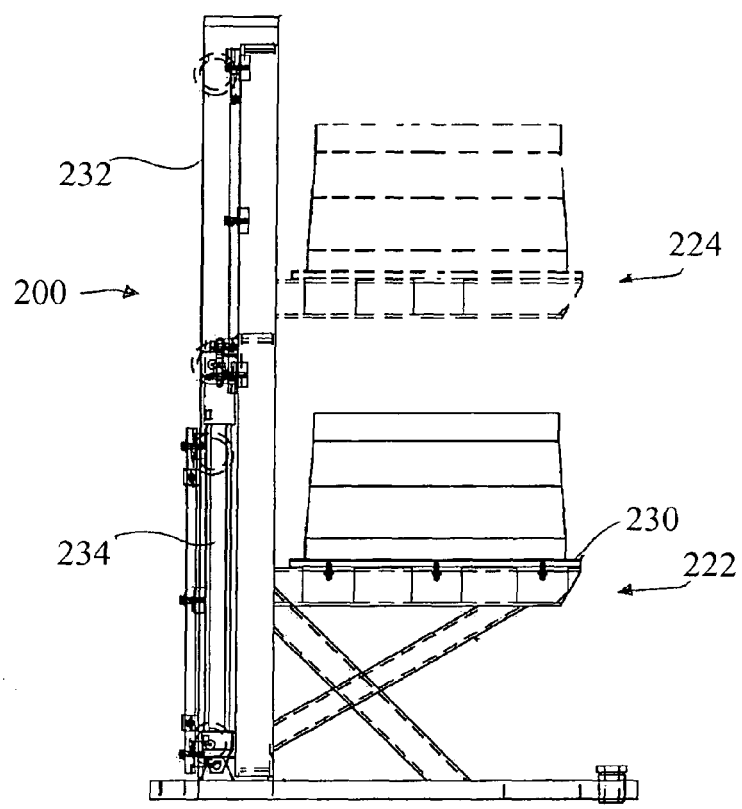
FIG. 5 is a side view of a lifting device (separate from the accumulating conveyor) according to one embodiment of this invention.

FIGS. 4 and 5 illustrate a transfer device 200 according to one embodiment of this invention, for placement in-stream between, for example, a sand mold forming station and an accumulating conveyor. The transfer device 200 of FIG. 4 is particularly useful in adapting the accumulating conveyor 202 to a sand mold forming station 204 (representatively shown) having a mold outlet at a different height. The transfer station 200 includes an elevator changer 220 for vertically moving the produced sand molds from a first position 222 at the height of the forming station outlet to a second position 224 at the height of the accumulating conveyor 202.

The elevator changer 220 includes a mold platform 230 connected to and vertically movable with respect to a frame 232. The frame 232 is desirably fixed to the accumulating conveyor 202, but can be alternatively fixed to the floor adjacent to the accumulating conveyor. A pressurized fluid piston 234, or any other suitable means, is attached between the frame 232 and the mold platform 230 for lifting the molds platform 230 with respect to the frame 232.

As shown in FIG. 4, the transfer device 200 includes a pulling mechanism 240 for moving the sand molds from the mold platform 230 to the accumulating conveyor 202. In FIG. 4, the pulling mechanism 240 extends above the accumulating conveyor 202. The pulling mechanism 240 includes a frame 242 fixed to the accumulating conveyor 202 and including two opposing rails 244. A puller 246 is disposed between the rails 242 and rides on wheels 248 that roll on the rails 242. A pressurized fluid piston 250, or other suitable means, is attached at opposing ends to the frame 242 and the puller 246, respectively, to move the puller 246 along the rails 242.

The puller includes a downwardly extending bar 254, such as a T-bar, or other suitably configured extension for contacting the sand molds and pulling the sand molds onto the accumulating conveyor upon movement of the puller 246 by the piston 250. The T-bar 254 moves between position 256 and position 258 to move the sand mold from the mold platform 230 to a carrier plate 252 of the accumulating conveyor 202.

Figure 6:
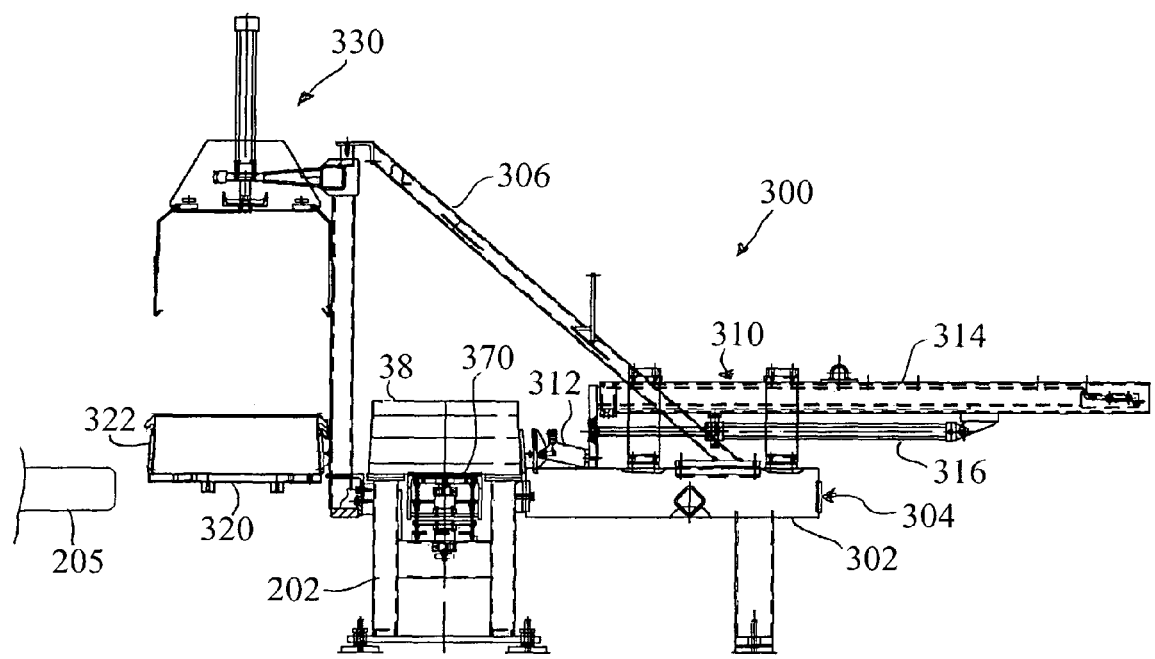
FIG. 6 is a side view of a transfer device according to another embodiment of this invention.

FIG. 6 illustrates a transfer device 300, according to another embodiment of this invention, such as, for example, for use in transferring the sand molds from the accumulating conveyor 202 to a rotary table 205. The transfer station 300 includes a base 304 including a frame 302 fixed to the accumulating conveyor 202 and including a lifter support 306 extending from the base 304 over the accumulating conveyor 202.

In one embodiment of this invention, the attachment of the base 304 to the side of the accumulating conveyor 202 allows for flexibility in the position the sand molds transfer from the accumulating conveyor 202 to the rotary table 205. As shown in FIGS. 1 and 3, the pusher mechanisms 94 and 174 are attached at the end of one of the parallel transfer conveyors. The transfer station of FIG. 6 can be attached at any carrier plate resting position between two adjacent, parallel transfer conveyors, such as at position 305 shown in FIG. 3.

The transfer station 300 includes a pusher mechanism 310 set on the base 304. The pusher mechanism 310 includes a pusher arm 312 movable with respect to a frame 314 by a pressurized fluid piston 316. In one embodiment of this invention, the pusher arm 312 moves to contact the sand mold 38 and pushes the sand mold 38 from the carrier plate 370 to a pouring plate 320. As known in the art of sand molding, a mold jacket 322 can be applied to the pouring plate 320. A jacket lifer 330 lifts a mold jacket 322 with the sand mold 38 for placement onto the rotary table 205.

Figure 7:
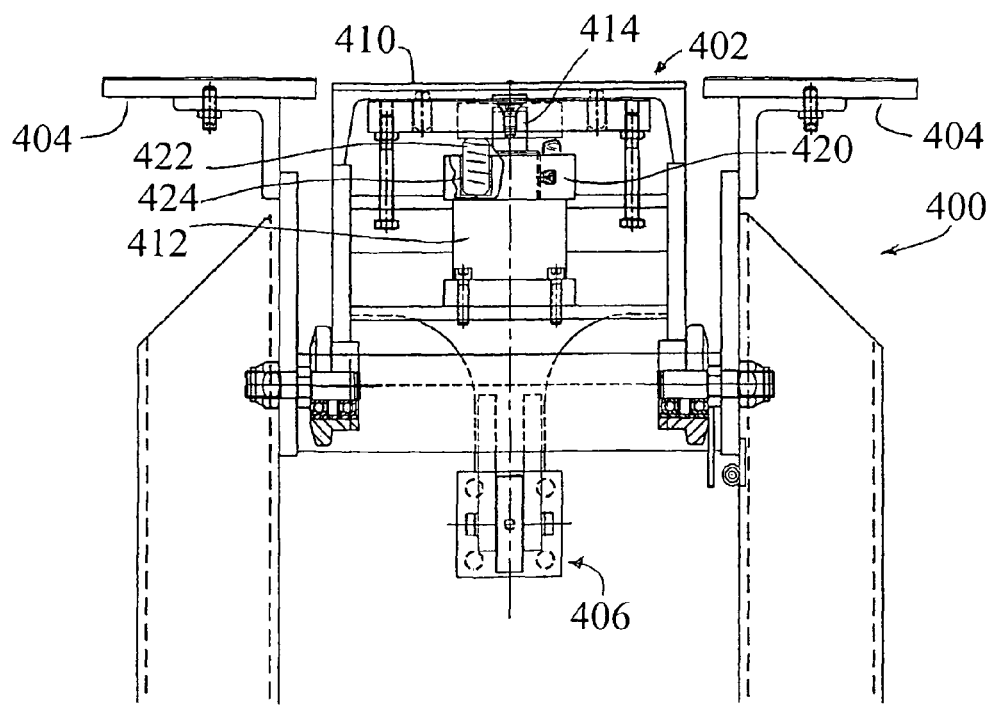
FIG. 7 is a partial sectional view of a transfer rail according to one embodiment of this invention.
Figure 8:
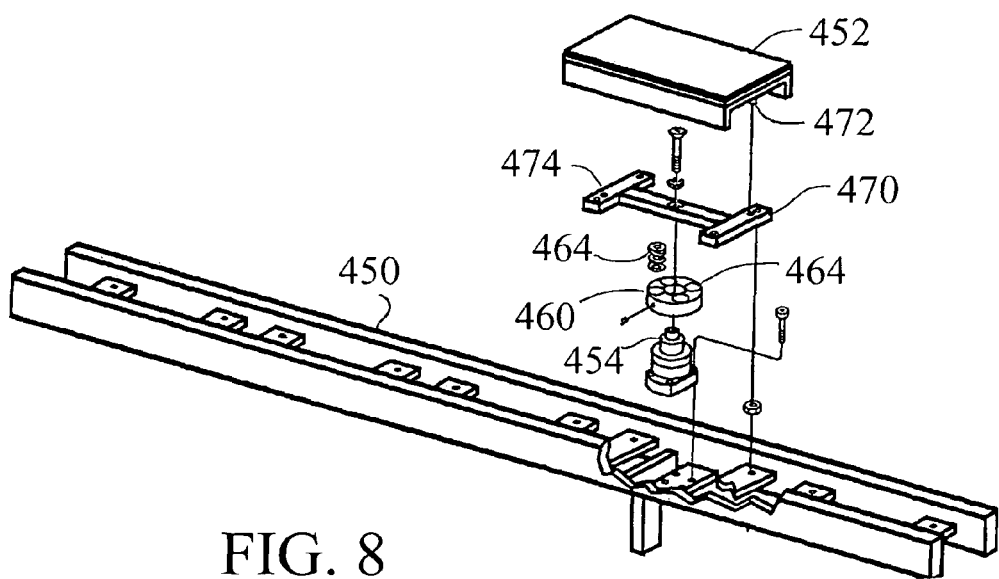
FIG. 8 is an exploded view of a transfer rail and carrier plate assembly according to one embodiment of this invention.

In some embodiments of this invention, to further improve the transfer of the sand molds along the accumulating conveyor, the carrier plates each include a biasing apparatus to assist in lifting the weight of the sand mold with the transfer rail. FIGS. 7 and 8 illustrate a transfer rail configuration according to one embodiment of this invention. FIG. 7 is a partial sectional end view of a transfer conveyor 400. The transfer conveyor 400 includes a transfer rail 402 movable with respect to two fixed rails 404 by longitudinally oriented pressurized fluid piston 406.

The transfer rail 402 includes a carrier plate 410 that is moved vertically a small distance, such as about ⅛ inch, by a lifting device 412. The lifting device 412 includes an upwardly oriented pressurized fluid piston 414, such as described above. In the embodiment of FIG. 7 a biasing apparatus is used in combination with the lifting device 412 to assist in lifting a sand mold (not shown), thereby allowing the use of smaller pistons in the limited space of the transfer rail. The biasing apparatus includes a spring block embodied as a collar 420 extending around the piston 414 and a plurality of springs 422 disposed between the collar 420 and the carrier plate 410. In the embodiment of FIG. 7, the collar 420 includes spring receptacles 424 to hold the springs 422 in place. The springs 422 contact, and exert upward force on, a support beam 424 on which the carrier plate 410 rests. The springs 422 are held under compression when the piston 414 is retracted to the down position. The compressed springs 422 thus provide a biasing force that increases the lifting force when the piston 414 is extended upwards, thereby providing additional or sufficient power to overcome the weight of the sand mold. The support beam 424 provides additional support for the sand mold, and receives, supports, and/or distributes the upward force of the springs 422.

FIG. 8 shows an exploded view of a lifting device and biasing apparatus according to some embodiments of this invention. In FIG. 8, the lifting device and biasing apparatus are disposed between the transfer rail 450 and the carrier plate 452. The lifting device is embodied as pressurized fluid piston 454 that is fixed to the transfer rail 450. The biasing apparatus includes a collar 460 including spring receptacles 462 for containing springs 464 (only one spring shown). A support beam 470, embodied as an I-beam, on which the carrier plate 452 sits, is attached to the piston 454. The springs 464 desirably contact the underside of the support beam 470. The carrier plate 452 includes pegs 472 that correspondingly fit into peg openings 474 of support beam 470

In one embodiment of this invention, the movements and positions of the transfer rails are continually sensed between a first position and a second position. FIG. 7 illustrates a preferred sensor device and arrangement for monitoring the positions of the transfer rails and carrier plates, to ensure the transfer rails do not collide at junction stations. The sensor device of FIG. 7 includes a linear displacement sensor 430 attached to one of the fixed rails 404, and can convert the rectilinear motion of the carrier plate 410 into a corresponding electrical signal. In the embodiment of FIG. 7, the linear displacement sensor 430 includes a cylindrical body connected parallel to the accumulating conveyor by brackets 432. A follower 434 is fixed to the transfer rail 402 with respect to the carrier plate 410. As the follower 434 moves along the sensor 430, the follower triggers a detectable electrical signal. Exemplary linear displacement sensors are known and available, such as, for example, linear variable differential transformers (LVDT), which come in a variety of configurations and lengths. Various sensors and configurations are available for the accumulating conveyor of this invention. Desirably, the length of the sensor is at least as long as a stroke of the transfer rail that it is sensing. In one embodiment, for example, the sensor body extends a distance at least covering two positions of the transfer rail, thereby being able to sense the full back-and-forth stroke movement of the transfer rail.

Thus, the invention provides a mold accumulating conveyor that feeds sand molds from multiple sand mold forming machines to a single metal pouring station. The accumulating mold conveyor of this invention allows for use with forming machines and rotary tables of different height configurations, such as from different manufacturers. The mold accumulating conveyor of this invention also has improved carrier plates and sensors for improving the functioning of the accumulating conveyor and reducing or eliminating sand mold damage.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A method for conveying a sand mold, the method comprising:

transferring the sand mold from a sand mold forming station or metal pouring station to an accumulating conveyor including a transfer rail movable with respect to at least one fixed rail;

vertically moving the sand mold at a position between the sand mold forming station or metal pouring station and the accumulating conveyor, wherein the sand mold is vertically moved by an elevator changer fixed to the accumulating conveyor;

lifting the sand mold off the at least one fixed rail with the transfer rail;

moving the transfer rail and the lifted sand mold in a downstream direction;

lowering the lifted sand mold onto the at least one fixed rail;

moving the sand mold along the first transfer conveyor in a first direction; and transferring the sand mold from the accumulating conveyor.

2. The method according to claim 1, further comprising pulling the sand mold onto the accumulating conveyor.

3. The method according to claim 2, wherein the sand mold is pulled onto the accumulating conveyor by a pulling device fixed to the accumulating conveyor.

4. The method according to claim 1, further comprising continually sensing the position of the transfer rail as it moves between a first position along at least one of the first and second transfer conveyors.

5. The method according to claim 4, wherein the sensing is performed by a linear displacement sensor attached to the fixed rail.

6. The method according to claim 1, wherein the accumulating conveyor comprises a plurality of first transfer conveyors in conveying combination with a second transfer conveyor, each of the first and second transfer conveyors comprising a transfer rail movable with respect to a fixed rail.

7. The method according to claim 6, further comprising:
transferring a plurality of sand molds from each of the plurality of first transfer conveyors to the second transfer conveyor;
moving the sand molds along the second transfer conveyor in a direction at an angle to the first transfer conveyors; and
pushing each of the sand molds off of the second transfer conveyor at a position between two adjacent first transfer conveyors.

8. The method according to claim 1, further comprising biasing the sand mold upward from the at least one fixed rail.

9. A method for conveying a sand mold, the method comprising:
transferring the sand mold from a sand mold forming station or metal pouring station to an accumulating conveyor including a transfer rail movable with respect to at least one fixed rail;
biasing the sand mold upward from the at least one fixed rail, wherein the biasing comprises a compressed spring disposed between the sand mold and the transfer rail;
lifting the sand mold off the at least one fixed rail with the transfer rail;
moving the transfer rail and the lifted sand mold in a downstream direction;
lowering the lifted sand mold onto the at least one fixed rail;
moving the sand mold along the first transfer conveyor in a first direction; and
transferring the sand mold from the accumulating conveyor.

10. The method according to claim 9, further comprising vertically moving the sand mold at a position between the sand mold forming station and the accumulating conveyor.

11. The method according to claim 10, wherein the sand mold is vertically moved by an elevator changer fixed to the accumulating conveyor.

12. An apparatus for conveying sand molds, comprising:
a first transfer conveyor oriented in a first direction and including at least one transfer rail movable with respect to at least one fixed rail;
a second transfer conveyor in conveying combination with the first transfer conveyor and oriented in a second direction that is different than the first direction, the second transfer conveyor including at least one transfer rail movable with respect to at least one fixed rail;
the transfer rail of each of the first and second transfer conveyors including a frame and a plurality of carrier plates, wherein each of the plurality of carrier plates is attached along the frame by a pressurized fluid lift mechanism adapted to lift and lower a corresponding carrier plate and a sand mold; and
a transfer device attached in combination with the first transfer conveyor, wherein the transfer device transfers a sand mold from a sand mold forming station to the first transfer conveyor.

13. The apparatus according to claim 12, wherein the transfer device comprises a puller mechanism in combination with the first transfer conveyor adapted to pull the sand mold onto the first transfer conveyor.

14. The apparatus according to claim 12, wherein the transfer device comprises a lifting mechanism in combination with the first transfer conveyor and disposed in-stream between the first transfer conveyor and sand mold forming station.

15. The apparatus according to claim 12, further comprising a linear displacement sensor attached to the fixed rail.

16. An apparatus for conveying sand molds, comprising:
a first transfer conveyor oriented in a first direction and including a transfer rail movable with respect to at least one fixed rail;
a second transfer conveyor in conveying combination with the first transfer conveyor and oriented in a second direction that is different than the first direction, the second transfer conveyor including a transfer rail movable with respect to at least one fixed rail;
at least one of the first transfer conveyor or the second transfer conveyor including a carrier plate fixed on the transfer rail, a lifting device disposed between the carrier plate and the transfer rail, and a biasing apparatus connected between the lifting device and the carrier plate; and
a transfer device attached in combination with the first transfer conveyor, wherein the transfer device transfers a sand mold from a sand mold forming station to the first transfer conveyor.

17. The apparatus according to claim 16, wherein the transfer rail of each of the first and second transfer conveyors comprises a frame and a plurality of carrier plates, wherein each of the plurality of carrier plates is attached along the frame by a pressurized fluid lift mechanism adapted to lift and lower a corresponding carrier plate and a sand mold.

18. The apparatus according to claim 16, wherein the biasing apparatus comprises a spring.

19. The apparatus according to claim 18, wherein the lifting device includes a hydraulic or pneumatic piston, and the biasing apparatus comprises a spring block in combination with the piston and including a plurality of springs disposed between the spring block and the carrier plate.

20. The apparatus according to claim 19, further comprising a support beam disposed between the carrier plate and the plurality of springs.

* * * * *